US 8,522,812 B2

(12) United States Patent
Rocheleau

(10) Patent No.: US 8,522,812 B2
(45) Date of Patent: Sep. 3, 2013

(54) VALVE HANDLE WITH PERMANENT, INTEGRAL IDENTIFICATION

(76) Inventor: John W. Rocheleau, Rye, NH (US)

(*) Notice: Subject to any disclaimer, the term of this patent is extended or adjusted under 35 U.S.C. 154(b) by 10 days.

(21) Appl. No.: 13/328,064

(22) Filed: Dec. 16, 2011

(65) Prior Publication Data

US 2012/0153203 A1 Jun. 21, 2012

Related U.S. Application Data

(60) Provisional application No. 61/423,946, filed on Dec. 16, 2010.

(51) Int. Cl.
*F16K 31/60* (2006.01)
*G09F 3/00* (2006.01)

(52) U.S. Cl.
USPC ............... 137/315.15; 137/315.12; 40/332

(58) Field of Classification Search
USPC ............. 137/15.17, 15.18, 315.12, 315.15; 40/332
See application file for complete search history.

(56) References Cited

U.S. PATENT DOCUMENTS

| | | | | | |
|---|---|---|---|---|---|
| 1,843,294 | A | * | 2/1932 | Meyer | 40/622 |
| 4,219,021 | A | * | 8/1980 | Fink | 137/556.6 |
| 4,894,647 | A | * | 1/1990 | Walden et al. | 340/815.45 |
| 5,482,251 | A | * | 1/1996 | Roberts | 251/288 |
| 6,332,233 | B1 | * | 12/2001 | Proulx | 15/167.1 |
| 7,318,293 | B2 | * | 1/2008 | Ardern, II | 40/666 |
| 2009/0255087 | A1 | * | 10/2009 | Fawcett, Jr. | 16/110.1 |

* cited by examiner

*Primary Examiner* — John K Fristoe, Jr.
*Assistant Examiner* — Kevin Barss
(74) *Attorney, Agent, or Firm* — Michael J Persson; Catherine E. Napjus; Lawson Persson & Weldon-Francke PC

(57) ABSTRACT

A valve handle that operates a valve, and includes permanent, integral labeling. The labeling includes installer information about the installer of the valve handle, including the installer's name and contact information; and the function of the valve operated by said valve handle.

6 Claims, 15 Drawing Sheets

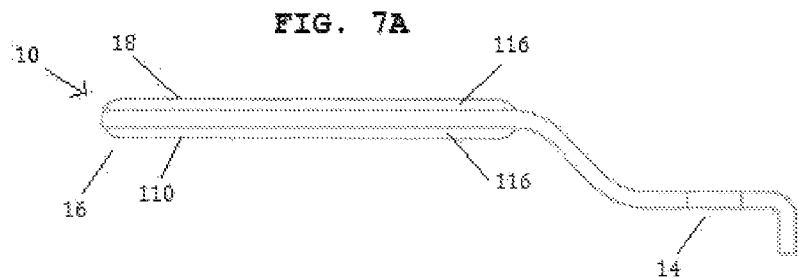
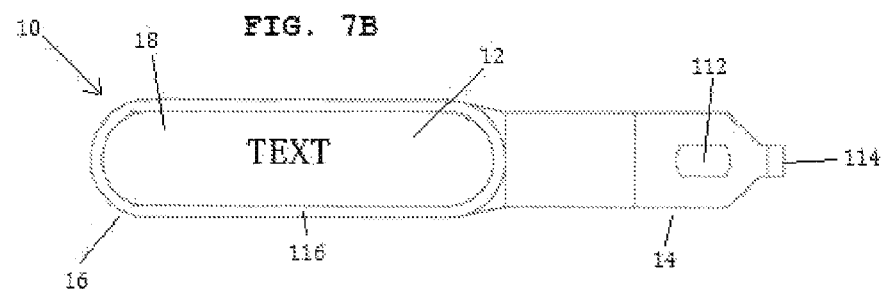
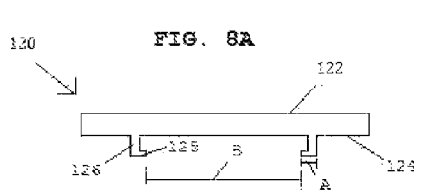
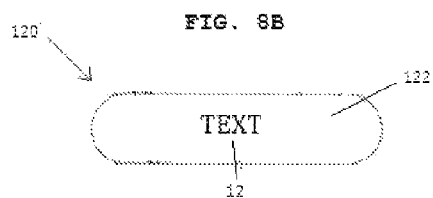
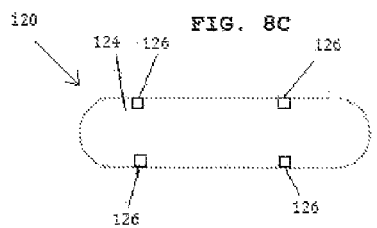
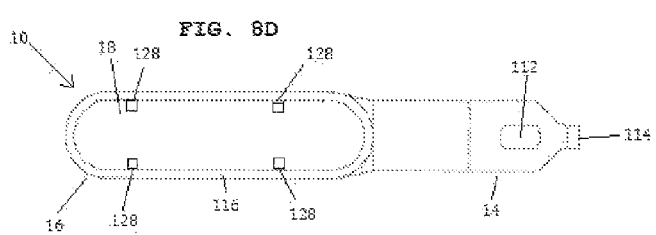

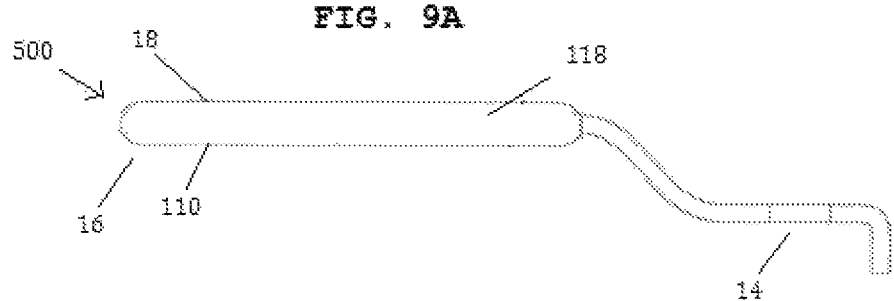
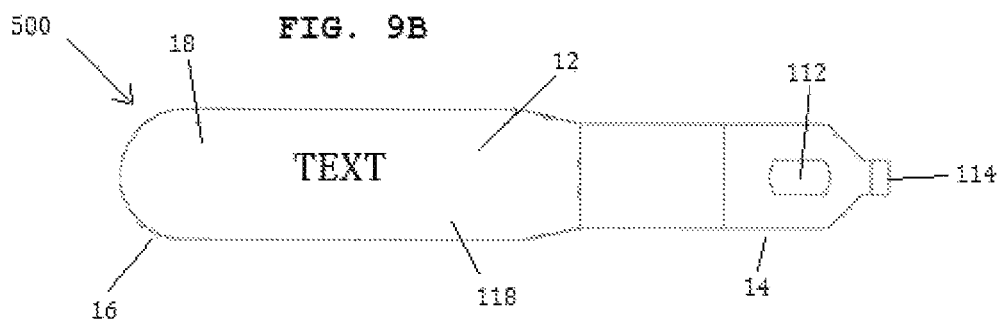

FIG. 11A
FIG. 11B
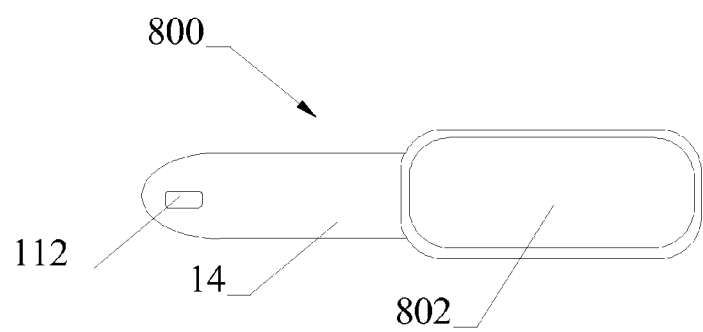
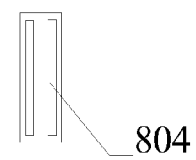
FIG. 11C
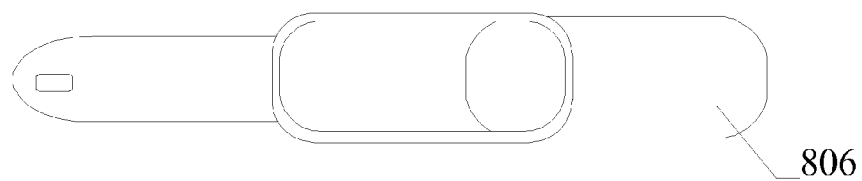

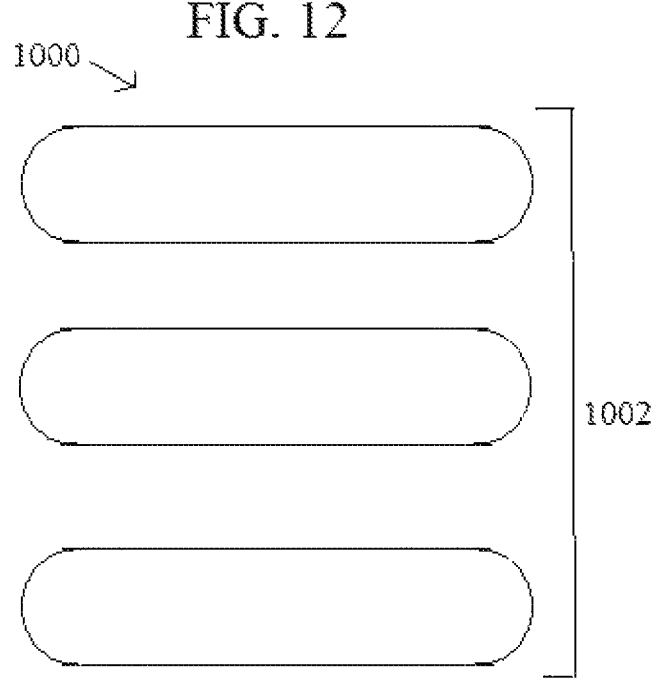

FIG. 13
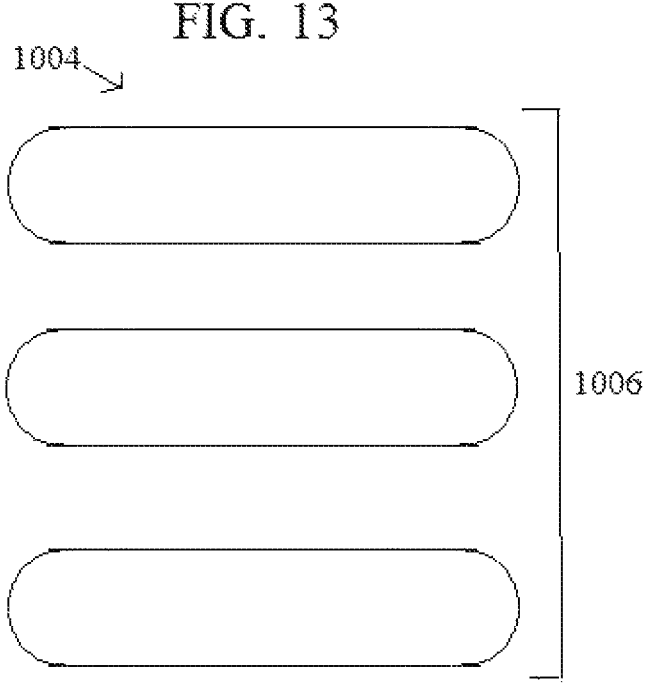
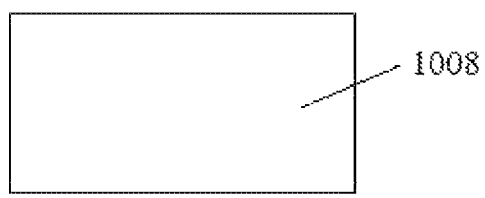

VALVE HANDLE WITH PERMANENT, INTEGRAL IDENTIFICATION

CLAIM OF PRIORITY

This application is a nonprovisional application that claims the benefit of priority of U.S. Provisional Patent Application Ser. No. 61/423,946, filed on Dec. 16, 2010.

FIELD OF THE INVENTION

The present invention relates to valve handles and methods for marketing and producing the same, and in particular, to customized, permanently labeled valve handles for use in HVAC and plumbing applications.

BACKGROUND

The maintenance and repair of heating, ventilating, air conditioning (HVAC), and plumbing systems requires proper identification of the individual components that make up the system. System owners and HVAC professionals need to know which valves and pipes, for example, are dedicated to which system units, such as kitchen sink, first floor toilet, cold water shut off, fourth floor ice machine, etc. The original installer of an HVAC system may initially know the layout of a system well but, without proper labeling of the HVAC components, as the system needs maintenance over the course of its life, the installer may not remember the layout perfectly. This is especially true as valves and other HVAC components in a utility space usually all look very similar.

It is also common for other HVAC professionals or system owners to need to work on the system and they may have no idea which valves control which system units. As valves are often controlling liquid or gas access at the beginning of a main branch of a local utility system, it is particularly important for the valve user to know what the consequence of opening or closing the valve will be, so as not to flood or otherwise damage the HVAC/plumbing system, building in which the HVAC/plumbing system resides, and/or valve user. If the valves are not properly labeled, a simple faucet leak that might usually easily be fixed by a system owner, might unnecessarily require the calling in of an HVAC/plumbing professional. That professional may have to perform unnecessary and potentially dangerous experimentation to properly identify the correct valve. More importantly, in the case of a burst pipe or other circumstance when a valve needs to be closed quickly, the system owner and/or HVAC professional need to be able to quickly identify HVAC/plumbing system components. Should the wrong valve be turned, or precious time wasted closing different valves, a simple situation can become a very costly one.

Beyond the need to provide an identification of the HVAC system component controlled by a valve, future owners or users of the system may also need to identify and contact the HVAC professional who installed the system. For example, it is common for a complex HVAC system to be installed in a house that is subsequently sold or rented out. Should repairs or maintenance be necessary, the new owner or tenant would not know who installed the system and could spend a considerable amount of money having another professional learn about the system to perform a task that could be inexpensively performed by the initial installer.

Several options currently exist to label system components. Valves may include indications to let a user know when the valve is open or closed, but this does not tell the user anything about the aspect of a system that the valve serves. Valve tags may be attached to valves to identify their function. However, tags may be removed, damaged, or lost so that the identification is thwarted. Painting or stickers may also be applied to surfaces to identify components. However, painting and stickers also may fade, suffer from humidity or water damage, be removed, etc. Therefore, such identification options have the potential to lose their utility over the course of the HVAC system's life. Moreover, such options traditionally do not include information such as the date of installation or contact information for the valve supplier and/or installer.

Therefore there is a need for permanent integral identification of the function of and information about HVAC/plumbing system components, the date of installation and contact information for the valve supplier and/or installer.

SUMMARY OF THE INVENTION

The present invention includes a method for marketing custom valve handles, methods for producing custom valve handles, custom valve handles, and two kits including a set of standard custom valve handles.

In its most basic form, the method for marketing custom valve handles includes the following steps: the seller providing a website including valve handle options available to the customer; the customer entering customization information and ordering one or more customized valve handles; the seller obtaining approval of a customized handle design from a handle manufacturer; the handle manufacturer producing a sample valve handle; the seller shipping the sample valve handle to the customer; the customer approving the sample valve handle; the handle manufacturer producing the remainder of the valve handles ordered by the customer; the seller shipping the remainder of the valve handles to the customer; and the seller billing the customer.

The first step of the seller providing a website including valve handle options available to the customer may include the following steps: listing the types of valves for which the seller can sell coordinating valve handles; listing the different sizes in which the valve handles come; informing the customer of the amount of space the customer has to include text for various valve handle sizes; providing sample texts on valve handles; providing an application that allows the customer to create mockups of various designs with font, font size, text, and text placement on the valve handle chosen by the customer; listing the different methods for permanently labeling valve handles; providing cost information corresponding to the various options listed; and informing the customer of minimum order requirements.

The second step of the customer entering customization information and ordering one or more customized valve handles may include the following steps: the customer choosing what type of valve the valve handles need to be attachable to; the customer choosing the valve handle size; the customer choosing a method for permanently labeling valve handles; the customer selecting a quantity of valve handles; the customer indicating what font, font size, text, and text placement the valve handles within the quantity will include; and the customer providing billing information. In embodiments of the marketing method where the first step includes the step of providing an application that allows the customer to create mockups of various designs with font, font size, text, and text placement on the valve handle chosen by the customer, the second step may also include the step of the customer providing a preferred mockup of design.

In embodiments of the marketing method where the first step does not include the step of providing an application that allows the customer to create mockups of various designs with font, font size, text, and text placement on the valve handle chosen by the customer, the marketing method may also include the steps of the seller developing a valve handle design based on the criteria provided by the customer, and the seller getting approval of the design from the customer. In short, the design for the valve handles may be created by the customer on the seller's website if the seller provides an appropriate application, or the design may be created by the seller based on the criteria provided by the customer.

The third step of the seller getting approval of a design from a handle manufacturer involves making sure that the handle manufacturer who will be producing the valve handles with the design is capable of recreating the design on a valve handle. In cases where the handle manufacturer determines he cannot recreate the design because it is too complicated, too crowded, or for other reasons, the third step may include the steps of providing suggestions to the customer or seller, depending on who created the design, as to what changes need to be made for the design to be creatable on a valve handle; and the customer or seller providing revised designs until a design is provided that the handle manufacturer can recreate.

At this point, the fourth, fifth, and sixth steps of the handle manufacturer producing a sample valve handle, the seller shipping the sample valve handle to the customer, and the customer approving the sample valve handle may occur. If the customer approves the sample valve handle, then the seventh step of the handle manufacturer producing the remainder of the valve handles ordered by the customer may occur. If the customer does not approve of the sample valve handle, then the sixth step includes the step of the customer providing feedback to the seller or handle manufacturer as to what changes the customer desires; the seller or handle manufacturer creating a new design based on the desired changes; the customer approving the new design; the handle manufacturer producing a sample valve handle based on the new, approved design; the seller shipping the new sample valve handle to the customer; and the customer deciding if he approves of the new sample valve handle. If the customer approves of the new sample valve handle, the seventh step of the handle manufacturer producing the remainder of the valve handles ordered by the customer occurs. If the customer does not approve of the new sample valve handle, the additional steps in the sixth step, as described above, are repeated until the customer does approve them. After the seventh step occurs, the eighth step of the seller shipping the remainder of the valve handles to the customer may occur.

There are five preferred methods for producing custom valve handles. These methods may be options provided to the customer by the seller's website, as described in the first step of the marketing method above, or a single method may be chosen by the seller. The method chosen affects how the handle manufacturer produces the custom valve handles. The preferred methods are metal casting, plastic engraving, silk screening, handle covering, and injection molding.

The metal casting method includes the following steps: ensuring the valve handle is appropriately proportioned for use with the correct valve; developing a handle face design; developing an insert; fitting the insert; creating a mold; casting the valve handle; and finishing the valve handle, preferably by polishing and plating it.

The first step of ensuring the valve handle is appropriately proportioned for use with the correct valve involves making sure the valve handle has the correct attributes to be used with the valve of the customer's choosing. Various valves may require slight differences in valve handles. A valve handle may need more than one stop, for example. The stops and tabs need to be correctly positioned to attach to the valve. The hole through which a valve stem will be inserted for attachment with the valve may be valve brand specific. The seller may develop standard valve handle designs for commonly used manufacturers to achieve this step. This would involve creating valve handle portions that include the appropriate stem hole, tabs, and stops.

The second step of developing a design involves the customization. The customer will be given options as to the maximum number of letters or numbers, font, font size, text placement, and costs for variations. The customer will then select what information he wishes to include on the handle—function of the valve, date of installation, contact information for installer if different from the seller, for example. The customer may design the layout himself or the seller may do so using the customer's criteria. From there, the handle manufacturer must approve the design from a practical manufacturing standpoint.

The third step of developing an insert involves incorporating the design onto an insert. The insert is preferably a photo engraving of the design. There is also a master insert including the seller's insignia, which is preferably included on one side of every custom valve handle.

The fourth step of fitting the insert involves attaching the insert into a production pattern for metal casting. Preferably, each of the four standard sizes for lever-type valve handles will have a production pattern. This same production pattern may be used with valve handles corresponding to valves of all manufacturers. In the preferred embodiment, a raised ovular rim delineates the flat portion of the valve handle where text may be included. The text will be raised off of the valve handle to be flush with the height of the rim. Text may be included within the ovular rim in standard lines, around and within the rim and/or may comprise the rim itself. It is preferred that one side of every valve handle includes the seller's insignia and contact information. Thus, the preferred production pattern includes one side with the seller's insignia and one side with a raised ovular rim in which text will be customized. In the fourth step of the metal casting method, the insert is attached to the blank space within the raised ovular rim of the production pattern. This may be achieved using double sided tape or by other art recognized methods of removably affixing an insert within a pattern.

The fifth step of creating a mold involves creating a mold of a handle, including the customized text. The creation of the mold may be accomplished by any art recognized method, including sand casting, lost wax casting, or the like.

The sixth step of casting the valve handle involves actually creating the customized valve handle from the mold of the handle customized by the customer and the valve handle design specific to the valve manufacturer.

The seventh step of finishing the valve handle involves removing any sharp edges, making the raw casting more pleasing to the eye, and making sure that the text on the valve handle is legible. This is preferably accomplished by polishing and plating the handle. However, it may simply involve abrading the handle by tumbling or other methods in order to remove sharp edges and burrs. In some embodiments, the rim and lettering of the valve handle are painted or polished to appear gold in color and the remainder of the valve handle is painted or polished to appear black in color.

The plastic engraving method includes the following steps: ensuring the valve handle is appropriately proportioned for use with the correct valve; developing a design; creating a plastic insert; casting the valve handle; polishing and plating the valve handle; and fitting the plastic insert into the valve handle.

The first step of ensuring the valve handle is appropriately proportioned for use with the correct valve is as described above.

The second step of developing a design is as described above.

The third step of creating the plastic insert involves selecting a suitable plastic or composite material having a desired size and color. The material is then preferably machined, stamped, or injection molded to form an insert having the desired shape and size. The preferred insert has notches or notch counterparts that correspond with notch counterparts or notches in the valve handle so that the plastic insert may be easily snapped into or otherwise attached to the valve handle. The desired design is then formed in the top surface of the plastic insert using a router or similar art recognized device to engrave a design into a plastic insert. This is preferably controlled by a computer, but engraving may also be done by hand.

The fourth step of casting the valve handle involves casting the valve handle specific to the valve, including notches or notch counterparts in the grip portion of the valve handle so that the plastic insert may be attached to the grip portion of the valve handle.

The fifth step of finishing the valve handle is as above.

The sixth step of fitting the plastic insert into the valve handle involves placing one plastic insert including the seller's information on one side of the handle and one plastic insert including the design selected by the customer on the other side. The plastic inserts will be inserted into production patterns as discussed above with respect to the metal casting method. As with the production patterns described above with respect to the metal casting method, the production patterns for the plastic engraving method preferably come in all four standard sizes, and include a raised rim inside of which the text will be laid out. However, the production patterns used in the plastic engraving method include means for permanently attaching the insert to the handle, such as notches or notch counterparts that mate with corresponding notches in the insert, or an overhanging lip within which the insert may be press fit. The plastic inserts are permanently attached to the valve handle by snapping them into the valve handle via the notches and notch counterparts, by press fitting, or by other art recognized means of permanently attaching plastic to metal. In some embodiments, the valve handle and plastic insert do not include notches and notch counterparts, the valve handle includes two holes, and the plastic insert includes two protrusions corresponding to the holes. In such an embodiment, the plastic inserts are permanently attached to the valve handle by snapping the plastic inserts' protrusions into each other through the valve handle's holes.

In a variation on the insert method, the insert is not plastic, but metal, preferably magnesium. Neither the handle nor the insert includes notches, notch counterparts, or protrusions. Instead, the insert is press fit snugly into the pocket of the handle created by the rim. The insert's affixation may be reinforced by an adhesive, preferably a double sided tape, such as that sold under the brand name 3M. As with the plastic insert, the depth of the machined pocket of the handle matches the thickness of the metal insert so that insert designation is flush with the face of the valve handle.

The silk screening method includes the following steps: ensuring the valve handle is appropriately proportioned for use with the correct valve; and developing a design. There are then two options of sets of steps to finish the silk screening method. One option includes the following steps: covering the valve handle grip with PVC or injection molding a PVC grip to be fitted onto the valve handle grip; and silk screening the design on the PVC dipped valve handle. The other option includes the following steps: silk screening the design on an existing PVC handle grip; and fitting the handle grip onto the valve handle.

The silk screening method is not performed on a valve handle with a production pattern as described above with reference to the metal casting and plastic engraving methods. The silk screening method is performed on a flat valve handle with no rim or notches.

The first step of ensuring the valve handle is appropriately proportioned for use with the correct valve is as described above.

The second step of developing a design is as above in terms of the customer selecting a design for at least one side of the handle. This step also preferably includes the step of the seller developing a design to be included on one side of every handle.

In a first option for completing the silk screening method, the third step of covering the valve in PVC involves covering the grip portion of the valve handle with PVC or injection molding a PVC grip to be fitted on the grip portion. The option of covering the grip portion may involve powder coating. When using the silk screening method, the preferred valve handle is made of steel.

In the first option for completing the silk screening method, the fourth step of silk screening the design on the PVC covered valve handle involves silk screening the seller's design on one side of the handle and the customer's design on the other side of the handle.

In a second option for completing the silk screening method, the third step of silk screening the design on an existing PVC handle grip involves silk screening the seller's design on one side of the handle grip and the customer's design on the other side of the handle grip.

In the second option for completing the silk screening method, the fourth step of the method is fitting the silk screened handle grip covering onto the valve handle.

The handle grip covering method includes the following steps: ensuring the valve handle is appropriately proportioned for use with the correct valve; developing a handle grip face design; creating a production pattern; creating a handle grip covering mold; casting or injection molding the handle coverings; fitting the handle coverings; and finishing the valve handle, preferably by plating and polishing it. In some embodiments, the step of creating a production pattern is omitted and the step of creating a handle grip covering mold is replaced with creating a handle grip covering die.

The steps of the handle covering method are performed on a flat handle. The flat handle preferably includes two holes. The handle covering created by the steps of the handle covering method will be designed to fit into these holes to hold the handle covering securely on the valve handle.

The first step of ensuring the valve handle is appropriately proportioned for use with the correct valve is as described above.

The second step of developing a design is as described above.

When using a mold, the third step of creating a production pattern is as described above.

The fourth step of creating a handle grip covering mold or die involves creating a mold for a two piece handle covering that includes the chosen design on each piece. Each piece of the handle covering is sized and dimensioned to cover a side of the flat valve handle and lock with the other piece of the handle covering around the edges of the flat valve handle. The sides of each piece of the handle covering that will be flush against the valve handle and not visible preferably include protrusions sized and dimensioned to protrude into the holes of the flat valve handle. The protrusions of each piece of the handle covering will meet and lock within the holes of the valve handle, thus locking the handle covering firmly in place around the valve handle.

The fifth step of casting or injection molding the handle covering involves casting the two pieces of the handle covering including the custom design and protrusions. The handle coverings may be made of metal or plastic.

The sixth step of setting the handle covering involves positioning and affixing the cast handle covering pieces with their protrusions through the holes of the flat handle so that the two handle covering pieces fit snugly and securely around the flat handle.

The seventh step of finishing the valve handle is as described above.

Finger grips may be included in the handle coverings. These finger grips may be cast, PVC, or plastic. In such embodiments that include finger grips, the handle coverings may be formed so as to include the finger grips over the flat grip portion of the valve handle and include flat sides going around the grip portion where text may be included. Alternatively, the entire handle coverings may be cast with finger grips. The text could then be painted in layers or a painted raised ovular rim and text may be included around the sides of the handle coverings.

The injection molding method includes the following steps: developing a handle face design; creating a mold; creating the valve handle; and adding customer designated text.

The first step of developing a design is as described above.

The second step of creating a mold involves creating an injection mold for the valve handle that includes the appropriate/desired features. For example, the mold for the valve handle must have the appropriate tangs to work with the stops of the valve to which it will be attached. The seller's desired text and/or logo is included in the mold for one side of the grip section of the valve handle. A separate mold may also be made for each function/designation by the customer, but this is not preferred as each valve handle may include a separate function/designation requiring a mold for every valve handle. In embodiments where a separate mold is made for each function/designation by the customer, however, the last step of adding customer designated text is omitted from the injection molding method.

The third step of creating the valve handle involves injecting a plastic into the mold, letting the plastic cool, and ejecting the cooled, hard plastic from the mold.

The fourth step of adding customer designated text may be accomplished in several ways discussed above. The customer designated text may be added by silk screening, painting, routing, or any other manner commonly used in the art.

The custom valve handles of the present invention are the product of any of the preferred methods for custom producing valve handles. The valve handles are preferably lever-type valve handles. In some embodiments, however, the valve handles are round gate valve handles, and the customization occurs on the spokes of the valve handle. The valve handles may also be for stop and/or waste valves. The preferred valve handle is preferably made of iron, but may be made of bronze, steel, zinc/aluminum, or any other material commonly used in the art of plumbing and HVAC component handles. It is preferred that one side of every custom cast valve handle includes a standard design of the seller's choosing. The design preferably includes the seller's name and contact information. The information provided on the other side of the valve handle is chosen by the customer, but preferably includes the function/designation of the valve, the year of installation of the handle or HVAC/plumbing system, and the name and contact information of the installer if different from the seller. The valve handles may correspond with valves made by any valve manufacturer.

An alternative embodiment of valve handle of the present invention includes at least one, and preferably two, slots within the width of the handle. An indicator sized and dimensioned to be placed within the slots so as to be visible on the outside of the handle includes information on the installer, installation, and function of the valve handle. The indicator may be any item that includes the information and is sized and shaped so as to fit in the slots. Examples of indicators may be laminated paper, cardboard, or thin plastic or metal with etching. In embodiments of this valve handle where the indicator is less durable than plastic or metal, such as paper or cardboard, it is preferred that the valve handle include some sort of clear plastic window either affixed or able to be placed and removed as the outer faces of the valve handle.

In all embodiments of the custom valve handles of the present invention, some information, such as the seller's preferred information and/or logo may be permanently included in production patterns, designs, molds, and/or dies. Moreover, text may be silk screened, painted, or otherwise embellished to make the distinction between the text and the background more clear.

In its most basic form, the first kit of the present invention includes a set of standard custom valve handles. The standard set of custom valve handles includes at least two valve handles manufactured by one of the methods detailed above. These valve handles are preferably color coded, preferably in red and blue to indicate hot and cold, respectively. The valve handles are preferably made of anodized aluminum because it is easy to color in a wide range of colors. Alternatively, the valve handles may be made of iron, bronze, or other alloys with zinc, chrome, or nickel-plating, paint or lacquered finish. The valve handles include permanent, integral information as indicated above, such as the installer, installer contact information, and installation date.

The set of valve handles will also include a standard set of indications for function of the valve handle. This negates the need for customization of every valve handle. The valve handles may include all of the indications for a typical house, such as "bath 1 sink hot," "bath 1 sink cold," "bath 1 shower hot," "bath 1 shower cold," "bath 1 toilet," "kitchen sink hot," "kitchen sink cold," "fridge ice maker," "bath 2 sink hot," etc . . . Alternatively, given the option of color coding, the "hot" and "cold" indications may be excluded in favor of that indication by color of the valve handle. The indications may also be coded. For example, the indications may be "zone 1 a," "zone 1 b," "zone 1 c," "zone 2 a," "zone 2 b, "zone 2 c," etc. . . . , where each zone may indicate a floor or section of a house or building, and each letter may indicate a specific water use within that floor or section. The kit includes at least two handles with indications for some type of standard set.

In its most basic form, the second kit of the present invention includes a set of valve handles and a legend. These set of valve handles may be similar to some embodiments of the set of valve handles included in the first kit of the present invention, as described above, in that they include some sort of coding. For example, the set may include four valve handles indicating "zone 1," four valve handles indicating "zone 2," and four valve handles indicating "zone 3." The valve handles included in the second kit of the present invention may or may not include information about the installer and installation. That information is preferably included on the legend.

The legend also includes information deciphering the indications included on the valve handles. The legend may indicate that "zone 1" is the first floor, "zone 2" is the second floor, and "zone 3" is the third floor, for example. This allows relatively little information to be included on the valve handles themselves, which makes their manufacture less complicated and less expensive. The legend may take many forms, but is preferably a cast alloy pocket that may be affixed to a wall of a utility area. On the outside, the pocket includes permanent, integral information about the installer, including contact information, and date of installation, as well as the code to decipher the valve handles. The permanent integral information can be attached by any method described herein pertaining to handles. An installer or property owner may use the pocket to keep papers related to the system handy at all times. Alternatively, the legend may be any item that displays the installer and installation information and the key. A legend may be a laminated piece of paper that may be affixed to the wall, for example.

In some embodiments of the present invention, in addition to custom cast valve handles, or instead of custom cast valve handles, it is the valve itself, flanges associated with the valve, or other associated parts of the valve, that are customized.

Therefore it is an aspect of the present invention to provide permanent, integral identification of the function of plumbing/HVAC valve handles.

It is a further aspect of the present invention to provide permanent, integral written information on plumbing/HVAC components concerning their manufacture and installation.

It is a further aspect of the present invention to provide more user-friendly plumbing/HVAC systems.

It is a further aspect of the present invention to provide safer plumbing/HVAC systems.

It is a further aspect of the present invention to provide a method for marketing custom valve handles.

It is a further aspect of the present invention to provide a method for producing custom valve handles by metal casting.

It is a further aspect of the present invention to provide a method for producing custom valve handles by plastic engraving.

It is a further aspect of the present invention to provide a method for producing custom valve handles by PVC covering and silk screening.

It is a further aspect of the present invention to provide a method for producing custom valve handles by fitting the valve handles with custom silk screened plastic grips.

It is a further aspect of the present invention to provide a method for producing custom valve handles that include a two piece handle covering that securely fits over the valve handle.

It is a further aspect of the present invention to provide a method for producing custom valve handles that include finger grips.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 7A is a side view of a preferred embodiment of the present invention formed by metal casting or plastic molding.

FIG. 7B is top down view of a preferred embodiment of the present invention formed by metal casting or plastic molding.

FIG. 8A is a side view of a plastic insert.

FIG. 8B is top down view of a plastic insert.

FIG. 8C is a bottom up view of a plastic insert.

FIG. 8D is a top down view of a valve handle of the present invention to be used with a plastic insert.

FIG. 9A is a side view of a preferred embodiment of the present invention formed by silk screening.

FIG. 9B is a top down view of a preferred embodiment of the present invention formed by silk screening.

FIG. 11A is a top down view of a face of an alternative valve handle.

FIG. 11B is an end view of an alternative valve handle with slots.

FIG. 11C is a top down view of a face of an alternative valve handle receiving an indicator.

FIG. 12 is a diagram of the first kit of the present invention.

FIG. 13 is a diagram of the second kit of the present invention.

DETAILED DESCRIPTION

Figure 1:
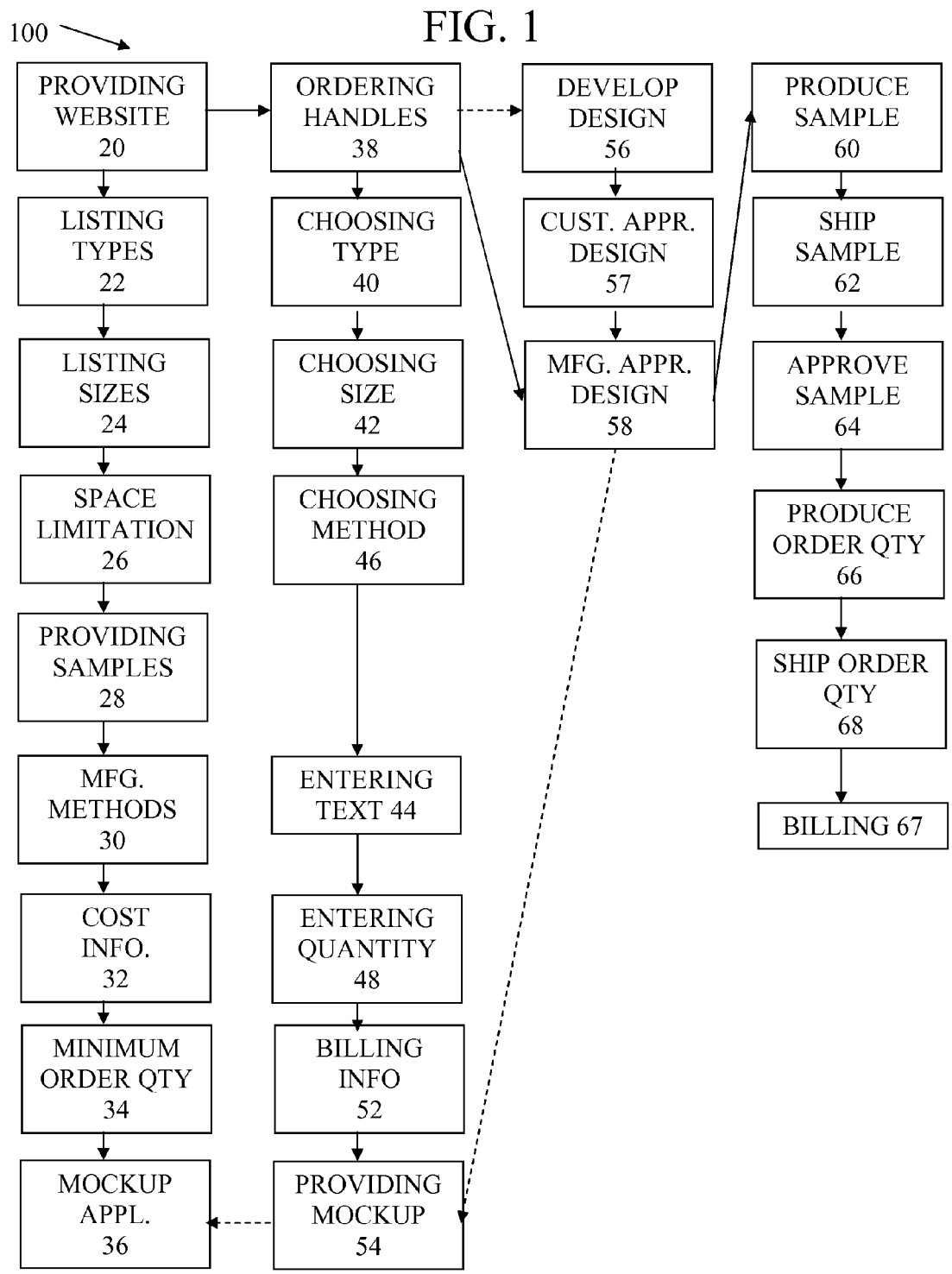
FIG. 1 is a block diagram showing the steps of the marketing method of the present invention.

Referring first to FIG. 1, the steps of marketing method 100 of the present invention are shown. The basic steps of marketing method 100 are as follows: the seller providing a website including valve handle options available to the customer 20; the customer entering customization information and ordering one or more valve handles 38; the seller getting approval of the customized handle design from a handle manufacturer 58; the handle manufacturer producing a sample valve handle 60; the seller shipping the sample valve handle to the customer 62; the customer approving the sample valve handle 64; the handle manufacturer producing the remainder of the valve handles ordered by the customer 66; the seller shipping the remainder of the valve handles to the customer 68; and the seller billing the customer 67.

The first step of the seller providing a website including valve handle options available to the customer 20 may include the following steps: listing the types of valves for which the seller can sell coordinating valve handles 22; listing the different sizes in which the valve handles come 24; informing the customer of the amount of space the customer has to include text for customizing various valve handle sizes 26; providing sample customized texts on valve handles 28; listing the different methods for permanently labeling valve handles 30; providing cost information corresponding to the various options listed 32; and informing the customer of minimum order requirements 34. In some embodiments of the marketing method 100, the step of providing an application that allows the customer to create mockups of various customized designs with font, font size, text, and text placement on the valve handle chosen by the customer 36 is also included. The different methods for permanently custom labeling valve handles that are listed in the step of listing the different methods for permanently labeling valve handles 30 are described in more detail with reference to FIGS. 2-5.

The second step of the customer entering customization information and ordering one or more valve handles 38 may include the following steps: the customer choosing what type of valve to which the valve handle needs to be attached 40; the customer choosing the valve handle size 42; the customer choosing a method for permanently labeling valve handles 46; the customer entering customization information and choosing from the seller the font, font size, text, and text placement for the valve handles 44; the customer selecting a quantity of valve handles 48; and the customer providing billing information 52. In embodiments of the marketing method 100 where the first step of providing a website 20 includes the step of providing an application that allows the customer to create mockups of various designs with font, font size, text, and text placement on the valve handle chosen by the customer 36, the second step of the customer ordering one or more valve handles 38 may also include the step of the customer providing a preferred mockup of design 54.

In embodiments of marketing method 100 where the first step of providing a website 20 does not include the step of providing an application that allows the customer to create mockups of various designs with font, font size, text, and text placement on the valve handle chosen by the customer 36, marketing method 100 may also include the steps of the seller developing a valve handle design based on the criteria provided by the customer 56, and the seller getting approval of the design from the customer 57. In short, the design for the valve handles may be created by the customer on the seller's website if the seller provides an appropriate application, or the design may be created by the seller based on the customization criteria provided by the customer.

The third step of the seller obtaining approval of a design from a handle manufacturer 58 involves making sure that the handle manufacturer who will be producing the valve handles with the design is capable of recreating the design on a valve handle. In cases where the handle manufacturer determines he cannot recreate the design because it is too complicated, too crowded, or for other reasons, the third step may include the steps of providing suggestions to the customer or seller, depending on who created the design, as to what changes need to be made for the design to be acceptably produced on a valve handle; and the customer or seller providing revised designs until a design is provided that the handle manufacturer can recreate.

At this point, the fourth, fifth, and sixth steps of the handle manufacturer producing a sample valve handle 60, the seller shipping the sample valve handle to the customer 62, and the customer approving the sample valve handle may occur 64. If the customer approves the sample valve handle, then the seventh step of the handle manufacturer producing the remainder of the valve handles ordered by the customer 66 may occur. If the customer does not approve of the sample valve handle, then the sixth step includes the step of the customer providing feedback to the seller or handle manufacturer as to what changes the customer desires; the seller or handle manufacturer creating a new design based on the desired changes; the customer approving the new design; the handle manufacturer producing a sample valve handle based on the new, approved design; the seller shipping the new sample valve handle to the customer, and the customer deciding if he approves of the new sample valve handle. If the customer approves of the new sample valve handle, the seventh step of the handle manufacturer producing the remainder of the valve handles ordered by the customer 66 occurs. If the customer does not approve of the new sample valve handle, the additional steps in the sixth step, as described above, are repeated until the customer does approve. After the seventh step occurs, the eighth step of the seller shipping the remainder of the valve handles 68 to the customer may occur.

FIGS. 2-6 show the methods of the five preferred methods for producing custom valve handles. These methods may be options provided to the customer by the seller's website as described in the first step of marketing method 100 above. The method chosen affects how the handle manufacturer produces the custom valve handles. The preferred methods are metal casting 200, plastic engraving 300, silk screening 400, handle covering 600, and injection molding 700.

Figure 2:
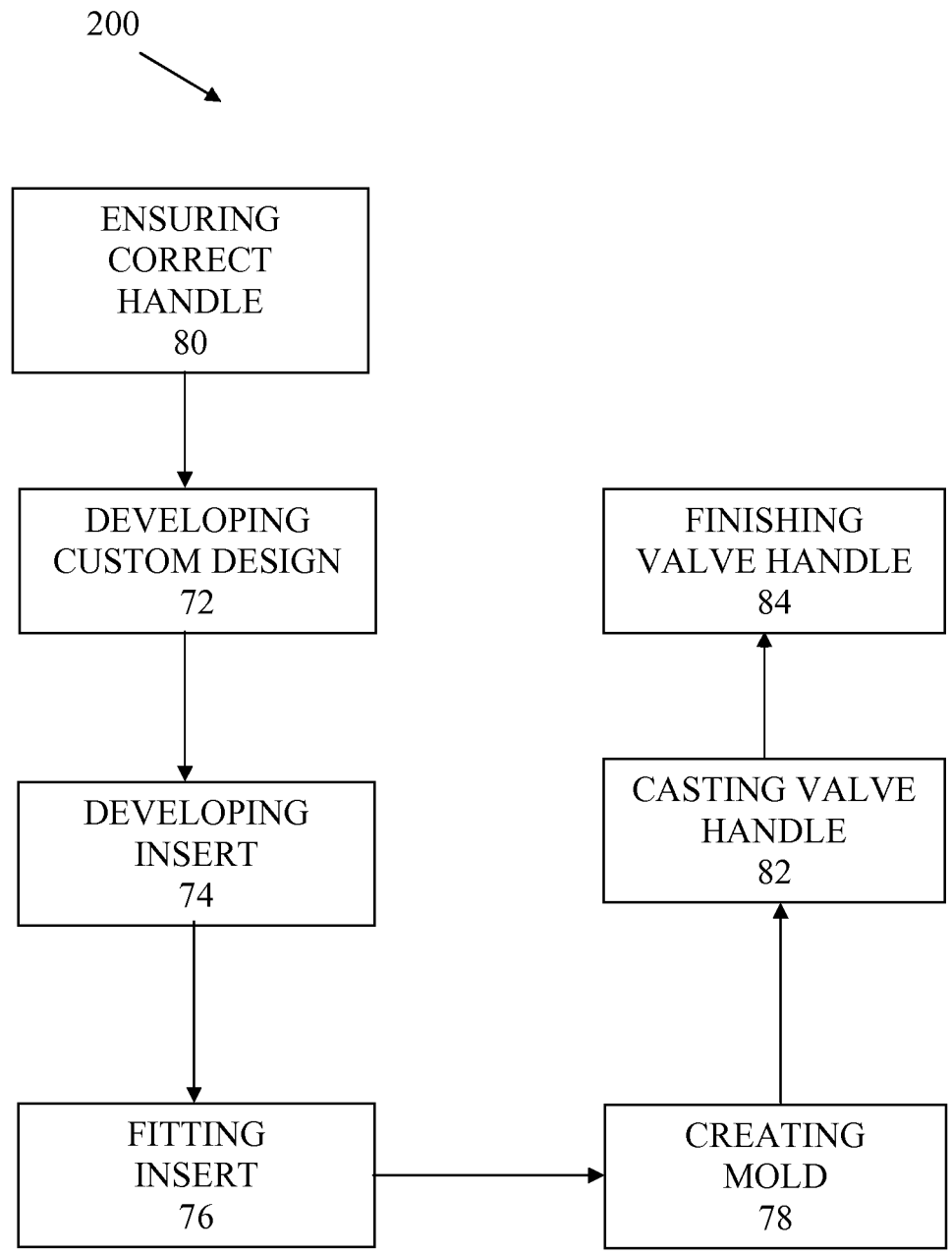
FIG. 2 is a block diagram showing the steps of the metal casting method of the present invention.

Now referring to FIG. 2, metal casting method 200 includes the following steps: ensuring the valve handle is appropriately proportioned for use with the correct valve 80; developing a design 72; developing an insert 74; fitting the insert 76; creating a mold 78; casting the valve handle 82; and finishing the valve handle 84.

The first step of ensuring the valve handle is appropriately proportioned for use with the correct valve 80 involves making sure the valve handle has the correct attributes to be used with the valve of the customer's choosing. Various valves may require slight differences in valve handles. A valve handle may need more than one tang, for example, to correspond to the stops of the valve to which it will be attached. The tangs need to be correctly positioned to attach to and operate the valve. The hole through which a screw will be threaded for attachment with the valve may be valve brand specific. The seller may develop standard valve handle designs for commonly used manufacturers to achieve this step.

The second step of developing a custom design 72 involves the customization. The customer will be given options for the maximum number of letters or numbers, font, font size, text placement, and costs for variations. The customer will then select what information he wishes to include on the handle—function of the valve, year of installation, contact information for installer if different from the seller, for example. The customer may design the layout himself or the seller may do so using the customer's criteria. From there, the handle manufacturer must approve the design from a practical manufacturing standpoint.

The third step of developing an insert 74 involves incorporating the design onto an insert. The insert is sized and shaped to fit within the depressed area of the master pattern, negative mold, or production pattern. In the preferred design, this depressed area is bordered by a raised ovular rim. The design is preferably incorporated into the insert by a photo engraving of the design. However, other art recognized methods of forming the design on the insert may be utilized to achieve similar results.

The fourth step of fitting the insert 76 involves attaching the insert to the depressed area of the master pattern, negative mold, or production pattern. This may be achieved by using double sided tape or other such known attachment methods.

Preferably, each of the four standard sizes for lever-type valve handles, sizes ⅜ inch to 2 inches, will have a production pattern and this same production pattern may be used with valve handles corresponding to valves of all manufacturers. However, different production patterns may be created for each different type and manufacturer of valve. In the preferred embodiment, a raised ovular rim delineates the flat portion of the valve handle where text may be included. The text is preferably raised off of the valve handle to be flush with the height of the rim. Text may be included within the ovular rim in standard lines, around and within the rim, or may form the rim itself. It is preferred that one side of every valve handle includes the seller's insignia and contact information. Thus, the preferred pattern includes one side with the seller's insignia and one side with a raised ovular rim in which text will be customized.

The fifth step of creating a mold 78 involves creating a mold of a handle, including the customized text placed as in the insert. This may be accomplished by sand casting, lost wax casting, or other known methods of creating a mold from a pattern.

The sixth step of casting the valve handle 82 involves production manufacturing the customized valve handle from the mold customized to the specifications of the customer and the valve handle design specific to the valve manufacturer.

The seventh step of finishing the valve handle 84 involves removing any sharp edges, making the raw casting more pleasing to the eye, and making sure that the text on the valve handle is legible. This is the preferably accomplished by polishing and plating the handle. However, it may simply involve abrading the handle by tumbling or other methods in order to remove sharp edges and burrs.

Figure 3:
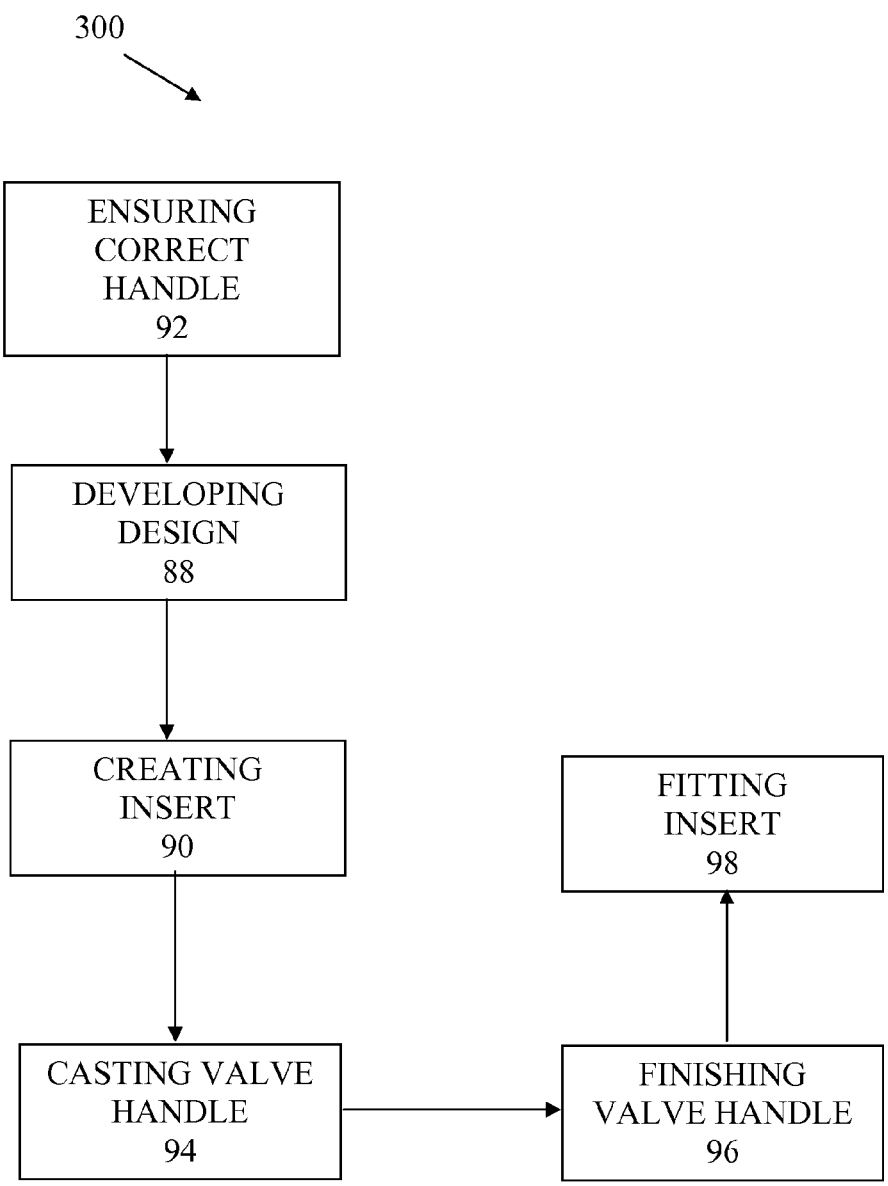
FIG. 3 is a block diagram showing the steps of the plastic engraving method of the present invention.

Now referring to FIG. 3, plastic engraving method 300 includes the following steps: ensuring the valve handle is appropriately proportioned for use with the correct valve 92; developing a design 88; creating a plastic insert 90; casting the valve handle 94; finishing the valve handle 96; and fitting the plastic insert into the valve handle 98.

The first step of ensuring the valve handle is appropriately proportioned for use with the correct valve 92 is as described above.

The second step of developing a design 88 is as described above.

The third step of creating the plastic insert 90 involves selecting a suitable plastic or composite material having a desired size and color. The material is then preferably machined, stamped, sand casted, photo engraved, or injection molded to form an insert having the desired shape and size. The desired design is then formed in the top surface of the plastic insert using a router or similar art recognized device to engrave a design into a plastic insert. The preferred insert has notches or notch counterparts that correspond with notch counterparts or notches in the valve handle so that the plastic insert may be easily snapped into or otherwise attached to the valve handle. This is preferably controlled by a computer, but engraving may also be done by hand.

The fourth step of casting the valve handle 94 involves casting the valve handle specific to the valve, including notches or notch counterparts in the grip portion of the valve handle so that the plastic insert may be attached to the valve handle.

The fifth step of finishing the valve handle 96 is as above.

The sixth step of fitting the plastic insert into the valve handle 98 involves placing one plastic insert including the seller's information on one side of the handle, preferably the back side, and one plastic insert including the design selected by the customer on the other side of the handle, preferably the front side. The plastic inserts will be used with production patterns as described above except the production patterns will be for plastic inserts, rather than for metal casting. As with the production patterns described above with respect to metal casting method 200, the production patterns for plastic engraving method 300 preferably come in all four standard sizes, and include a raised rim inside of which the text will be laid out. However, the production patterns used in the plastic engraving method include means for permanently attaching the insert to the handle, such as notches or notch counterparts that mate with corresponding notches in the insert, or an overhanging lip within which the insert may be press fit. The plastic inserts may be snapped into the valve handle, press fitted, or permanently affixed by another art recognized method. In some embodiments, the valve handle and plastic insert do not include notches and notch counterparts, the valve handle includes two holes, and the plastic insert includes two protrusions corresponding to the holes. In such an embodiment, the plastic inserts are permanently attached to the valve handle by snapping the plastic inserts' protrusions into each other through the valve handle's holes.

Figure 4:
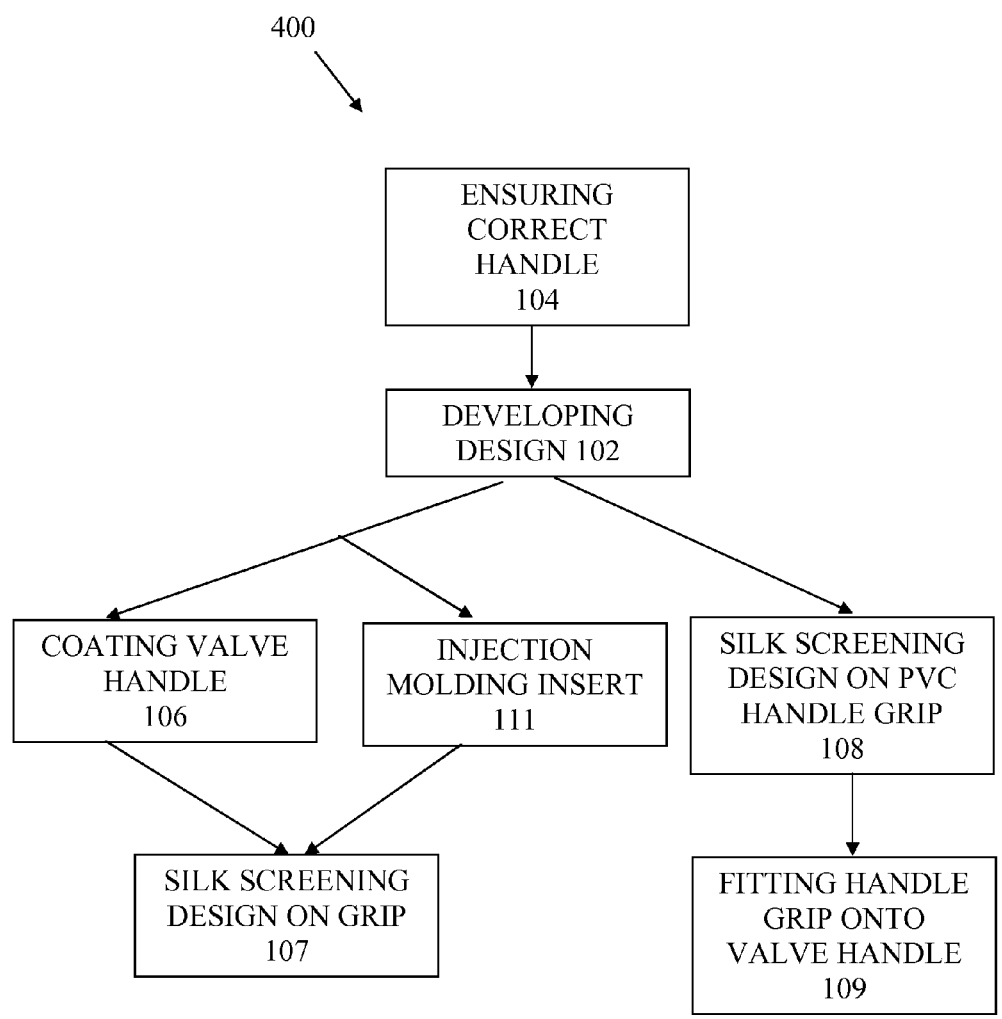
FIG. 4 is a block diagram showing the steps of the silk screening method of the present invention.

Now referring to FIG. 4, silk screening method 400 includes the following steps: ensuring the valve handle is appropriately proportioned for use with the correct valve 104; developing a design 102; and in one version, coating the grip of the valve handle in PVC 106 or injection molding the grip 111; and silk screening the design on the PVC coated grip 107; or in another version, silk screening the design on a PVC handle grip 108; and fitting the handle grip onto the valve handle 109.

The first step of ensuring the valve handle is appropriately proportioned for use with the correct valve 104 is as described above.

The second step of developing a design 102 is as above in terms of the customer selecting a design for at least one side of the handle, preferably the front side.

In a first embodiment of silk screening method 400, the third step is either coating the valve in PVC 106, which involves coating the grip portion of the valve handle in PVC, or injection molding a PVC sleeve 111 that will fit around the grip portion. When using silk screening method 400, the preferred valve handle is made of stamped steel. Alternatively, the valve handle could be sand cast, investment, die cast, or insert injection molded.

In the first embodiment of silk screening method 400, the fourth step of silk screening the design on the PVC coated grip 107 involves silk screening the seller's design on one side of the handle, preferably the back side, and the customer's design on the other side of the handle, preferably the front side. This step of silk screening the design on the PVC coated grip 107 occurs whether the grip of the valve handle has been coated directly with PVC as in step 106 or the PVC grip has been injection molded to fit onto the valve handle as in step 111.

In a second embodiment of silk screening method 400, the third step of silk screening the design on an existing PVC handle grip 108 involves silk screening the seller's design on one side of the handle grip, preferably the back side, and the customer's design on the other side of the handle grip, preferably the front side.

In a second embodiment of silk screening method 400, the fourth step is fitting the silk screened handle grip onto the valve handle 109.

Figure 5:
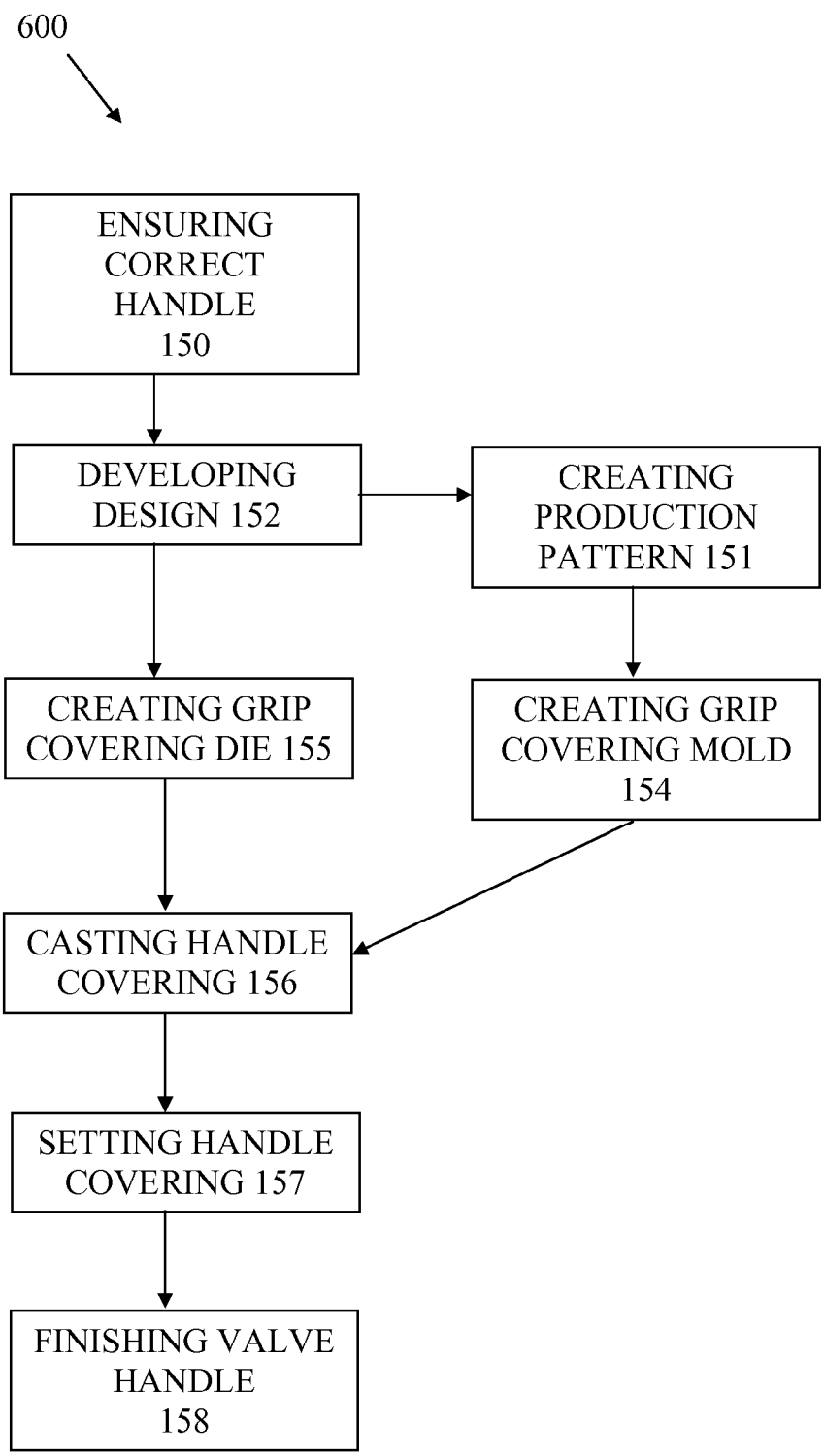
FIG. 5 is a block diagram showing the steps of the handle covering method of the present invention.

Now referring to FIG. 5, handle covering method 600 includes the following steps: ensuring the valve handle is appropriately proportioned for use with the correct valve 150; creating a production pattern 151; developing a handle grip design 152; creating a handle grip covering mold 154 or creating a handle grip covering die 155; casting the handle covering 156; setting the handle coverings 157; and finishing the valve handle 158.

The steps of handle covering method 600 are performed on a flat valve handle. The flat handle preferably includes two holes. The handle covering created by the steps of handle covering method 600 will be designed to fit into these holes to hold the handle covering securely to the valve handle.

The first step of ensuring the valve handle is appropriately proportioned for use with the correct valve 150 is as described above.

The second step of developing a design 152 is as described above.

When using a mold, the third step of creating a production pattern 151 is as described above.

The fourth step of creating a handle grip covering mold 154 or a handle grip covering die 155 involves creating a mold or die for a two piece handle covering that includes the chosen design on each piece. When the step 155 is used and step 154 is not used, step 151 is omitted. Each piece of the handle covering is sized and dimensioned to cover a side of the flat valve handle and lock with the other piece of the handle covering around the edges of the flat valve handle. The sides of each piece of the handle covering that will be flush against the valve handle and not be visible preferably include protrusions sized and dimensioned to protrude into the holes of the flat valve handle. The protrusions of each piece of the handle covering will meet and lock within the holes of the valve handle, thus locking the handle covering firmly in place around the valve handle.

The fourth step of casting the handle covering 156 involves casting the two pieces of the handle covering including the custom design and protrusions.

The fifth step of setting the handle covering 157 involves positioning and affixing the cast handle covering pieces with their protrusions through the holes of the flat handle so that the two handle covering pieces fit snugly and securely around the flat handle.

The sixth step of finishing the valve handle 158 is as described above.

Figure 6:
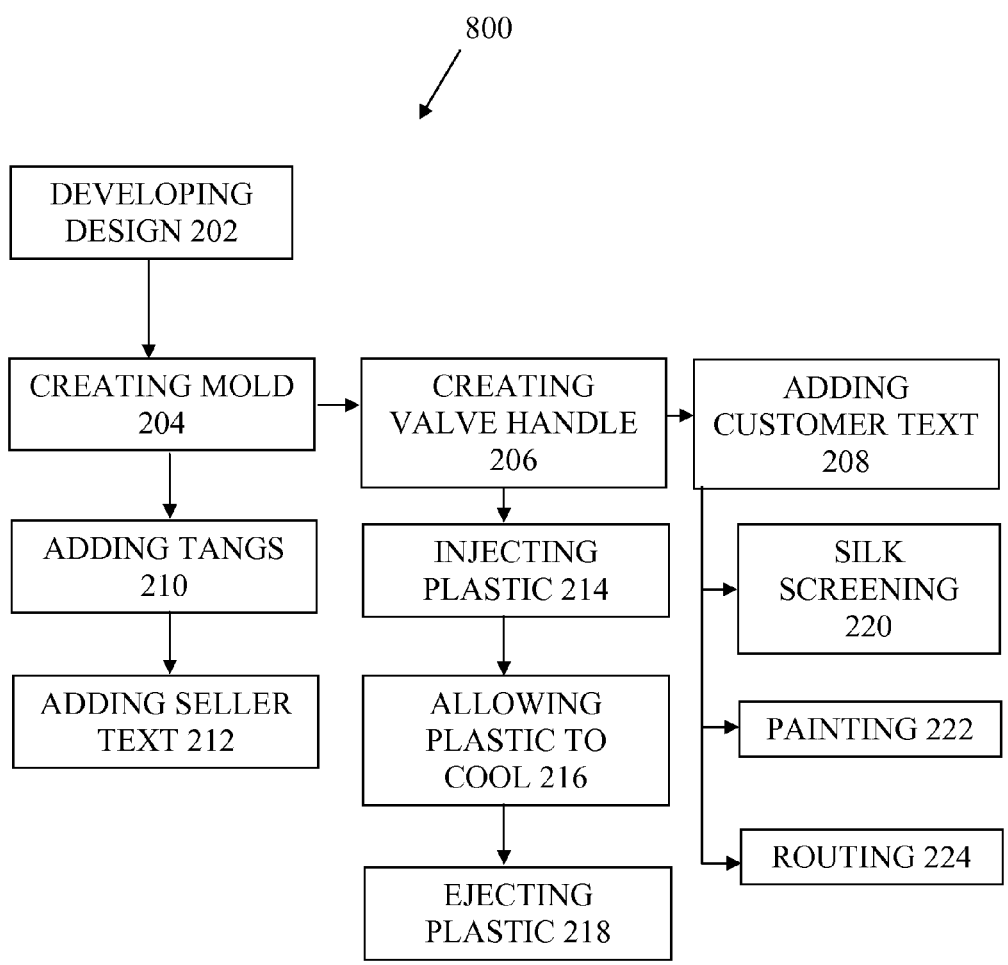
FIG. 6 is a block diagram showing the steps of the injection molding method of the present invention.

Referring now to FIG. 6, injection molding method 800 is shown including the following steps: developing a handle face design 202; creating a mold 204; creating the valve handle 206; and adding customer designated text 208.

The first step of developing a design 202 is as described above.

The second step of creating a mold 204 involves creating an injection mold for the valve handle that includes the appropriate/desired features. For example, the mold for the valve handle must have the appropriate tangs 210 to work with the stops of the valve to which it will be attached. The seller's desired text and/or logo 212 is included in the mold for one side of the grip section of the valve handle. A separate mold may also be made for each function/designation by the customer, but this is not preferred as each valve handle may include a separate function/designation requiring a mold for every valve handle. In embodiments where a separate mold is made for each function/designation by the customer, however, the last step of adding customer designated text is omitted from the injection molding method. The third step of creating the valve handle 206 involves injecting a plastic into the mold 214, letting the plastic cool 216, and ejecting the cooled, hard plastic 218 from the mold.

The fourth step of adding customer designated text 218 may be accomplished in several ways discussed above. The customer designated text may be added by silk screening 220, painting 222, routing 224, or any other manner commonly used in the art. Referring now to FIGS. 7A and 7B, side and top down views of a preferred embodiment of the present invention formed by metal casting, sand casting, or plastic engraving is shown. Valve handle 10 is preferably made of zinc aluminum, but may be made of any other metal commonly used in the art. Valve handle 10 includes attachment section 14 and grip section 16. Valve handle 10 comes in at least four standard sizes ranging from ⅜ inch to 2 inches. One standard sized valve handle 10, for example, is approximately 0.75 inches wide across its length, through attachment section 14 and widens at grip section 16. Its grip section 16 is preferably ovular in shape and has a length across the longest part of the oval of approximately 3.39 inches.

Attachment section 14 attaches to a valve (not shown) such that valve handle 10 may control the function of the valve. Attachment section 14 includes valve specific attributes, such as hole 112 and tang 114. The customer must specify what type of valve to which the valve handle 10 will be attached and submit to the seller a valve sample for use with the requested valve handle 10, so that attributes such as hole 112 and tang 114 may be properly cast. Different valves may require different sized or shaped holes 112; may have more than one tang 114 for more than one boss; and may have tang 114 positioned differently about attachment section 14. It is understood that the depiction of hole 112 and tang 114 in FIG. 7B is but one common configuration for a standard valve, and that there are many configurations that are included within the present invention.

Grip section 16 has a first side 18 and a second side 110. First and second sides 18, 110 each include text 12 within a rim 116. Rim 116 delineates a preferably ovular space of first and second sides 18, 110, and is slightly raised from the respective ovular spaces. Text 12 is within rim 116 and is also slightly raised from the ovular spaces so that the top of text 12 and the top of rim 116 are flush. It is preferable that second side 110 of every custom valve handle 10 includes the name of and contact information for the seller of valve handle 10. This information may also be on first side 18, but it is preferable that first side 18 includes information designated by the seller or customer, such as function of the valve to which valve handle 10 is attached, year of installation of the valve or HVAC system, and installer information if different from the seller information provided on second side 110.

Figure 8E:
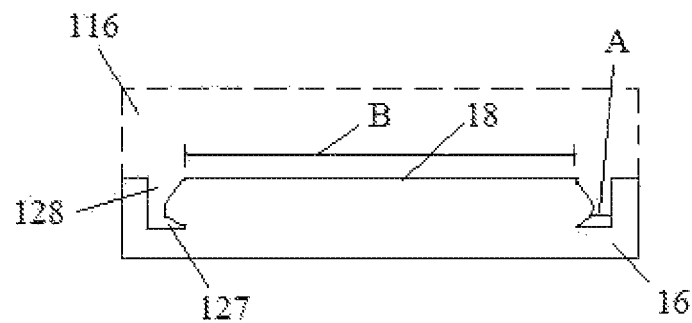
FIG. 8E is a side cutaway view of the grip portion of a valve handle of the present invention to be used with a plastic insert.
Figure 8F:
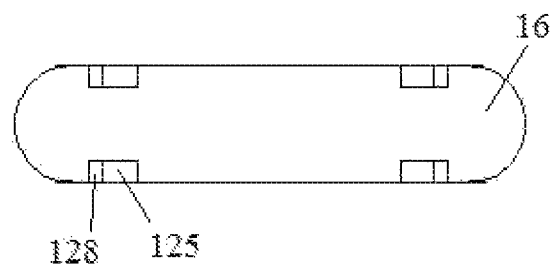
FIG. 8F is a bottom up cutaway view of a grip portion of a valve handle of the present invention with a plastic insert snapped into the grip portion.

When valve handle 10 has been produced using the metal casting method 200, valve handle 10, including text 12 is all one, integral metal piece. Now referring to FIGS. 8A-8F, when valve handle 10 has been produced using the plastic engraving method 300, valve handle 10 is one metal piece with a plastic insert 120 fitted within rim 116 on first and second sides 18, 110 of grip section 16. Plastic insert 20 is substantially flat and has top side 122 and bottom side 124 with notch counterparts 126 including lips 125 protruding from bottom side 124. Lips 125 protrude from the end of notch counterparts 126 and are designed to fit into catches 127 of notches 128, shown in FIG. 8E. Notch counterparts 126 are at their widest at lips 125, with width A. The distance between the tips of lips 125 of notch counterparts 126 that are positioned on the same side of a plastic insert 120 is distance B. Plastic insert 120 is sized and shaped so as to fit snugly within rim 116 and is thus preferably ovular like the preferred rim 116. FIG. 8B shows top side 122, which includes text 12 that preferably includes customer and/or seller chosen text. FIG. 8C shows bottom side 124, which includes notch counterparts 126 for permanent affixation to grip section 16 of valve handle 10. FIG. 8D shows valve handle 10 for use with plastic insert 120, which includes notches 128 into which notch counterparts 126 on plastic insert 120 may be snapped for permanent affixation. FIG. 8E shows a side cutaway view of grip section 16, which includes notches 128 with catches 127. Rim 116 is shown in dashed lines. Notches 128 are tapered toward first side 18 of grip section 16 so that lips 125 of notch counterparts 126 may easily enter notches 128. The distance between the beginning of this tapering of two notches 128 on the same side of grip section 16 is therefore the same distance B as between the ends of lips 125 as shown in FIG. 8A. As notch counterparts 126 move into notches 128, notch counterparts 126 will strain away from one another through the tapering of notches 128 and a section of notches 128 that is the same width A as notch counterparts 126 at their widest point. Catches 127 are at the bottom of notches 128 and lips 125 of notch counterparts 126 will snap into catches 127 when they reach them, thus releasing the strain of the notch counterparts. Thus, notch counterparts 126 have both sufficient flexibility to deform for the strain of entry into notches 128 and sufficient tension to reform once the strain is removed. In this way, notch counterparts 126 of plastic insert 20 snap into notches 128 of grip section 16 for permanent affixation. FIG. 8F is a bottom up cutaway of grip section 16 after plastic insert 20 has been snapped into place. The bottom of lip 125, which is the bottom of notch counterpart 126, is visible in notch 128. There is a space next to lip 125 in notch 128 that is empty. This is the space that was filled as notch counterpart 126 traveled down notch 128, but that became unfilled when lips 125 snapped into catches 127, which are not visible in this view because they are filled by lips 125. These illustrations show but one way that notches 128 and notch counterparts 126 may snap into one another for permanent affixation. Moreover, one of ordinary skill in the art will understand that there are many ways to achieve such permanent affixation, and each of these ways is included in the present invention.

Figure 10A:
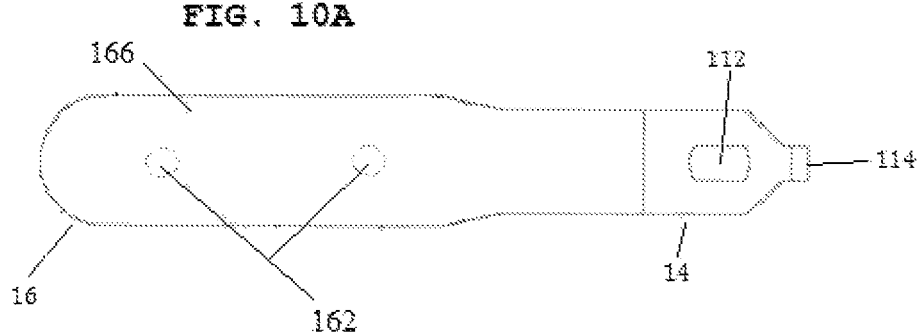
FIG. 10A is a top down view of a valve handle to be used in the handle covering method of the present invention.

In some embodiments of valve handle 10 produced by plastic engraving method 300, valve handle 10 and plastic insert 120 do not include notches and notch counterparts 126, 128. Although FIGS. 10A and 10C refer specifically to valve handles 700 produced by handle covering method 600, these figures are also illustrative for such embodiments of valve handles 10 produced by plastic engraving method 300. In such embodiments, grip section 16 includes two holes 162, as shown in FIG. 10A and plastic insert 120 includes two protrusions 168, similar to those shown in FIG. 10C. In this embodiment, however, protrusions 168 are a part of plastic insert 120 and protrude from bottom side 124 of plastic insert 120, rather than being a part of handle covering pieces 160, 164 as shown in FIG. 10C. Protrusions 168 of plastic insert 120 correspond to holes 162. Plastic inserts 120 are placed on either side of grip section 16 so that their protrusions 168 go through holes 162 and meet. Protrusions 168 snap into one another so that plastic inserts 120 are permanently attached to grip section 16 of valve handle 10 of the present invention.

Figure 8G:
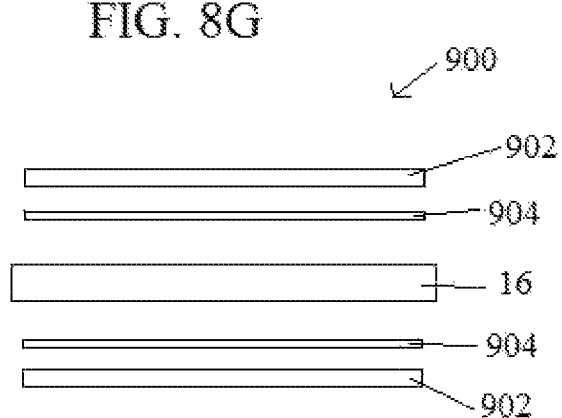
FIG. 8G is a side view of the layers of a grip portion of a valve handle of the present invention with a metal insert snapped into the grip portion.

Now referring to FIG. 8G, metal insert valve handle 900 is shown. Metal insert valve handle 900 is made from a variation on plastic engraving method 300. Metal insert 902 is not plastic, but metal, preferably magnesium. Neither grip portion 16 nor metal insert 902 includes notches, notch counterparts, or protrusions. Instead, metal insert 902 is press fit snugly into the pocket of grip portion 16 created by the rim. The affixation of metal insert 902 is reinforced by an adhesive, preferably double sided tape 904, such as that sold under the brand name 3M. As with plastic insert 120, the depth of the machined pocket of the handle matches the thickness of metal insert 902 and adhesive or tape so that the insert designation is flush with the face of the valve handle.

Now referring to FIGS. 9A and 9B, side and top down views of valve handle 500 of the present invention created by silk screening method 400 are shown. Valve handle 500 does not include rim 116 as shown in FIGS. 7A and 7B. Valve handle 500 includes PVC coating 118 onto which text 12 is silk screened. In other ways, valve handle 500 is similar to valve handle 10.

Figure 10B:
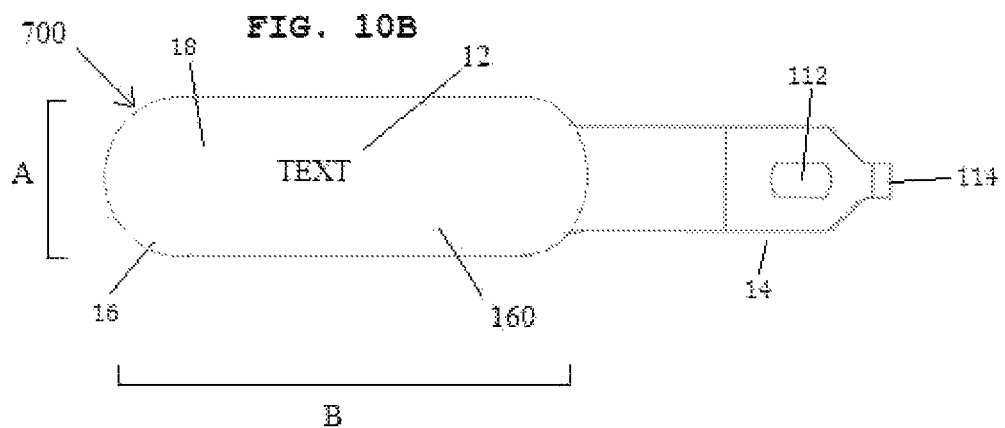
FIG. 10B is a top down view of a preferred embodiment of the present invention formed by handle covering.
Figure 10C:
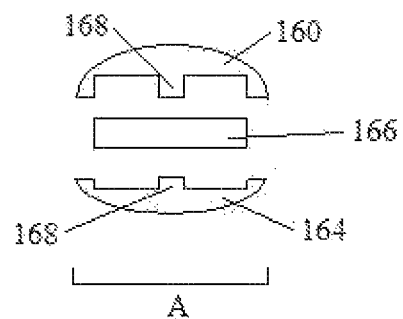
FIG. 10C is a cross section of the components of a valve handle formed by the handle covering method of the present invention before the components have been secured together.
Figure 10D:
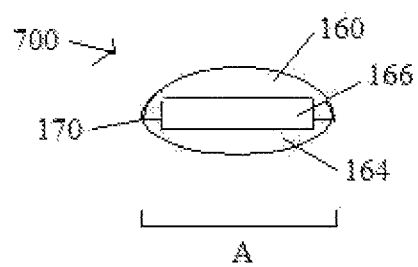
FIG. 10D is a cross section of a valve handle formed by the handle covering method of the present invention.
Figure 10E:
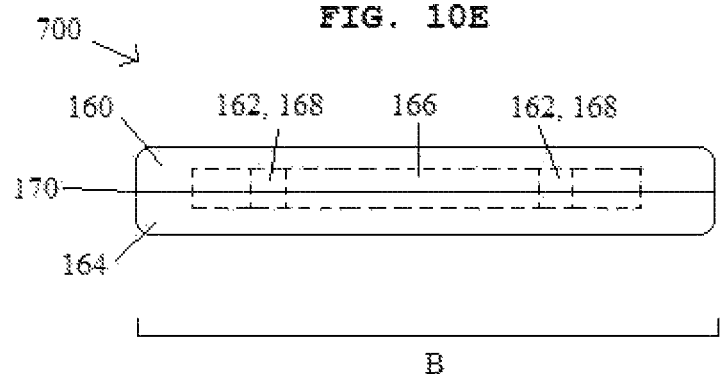
FIG. 10E is another cross section of a valve handle formed by the handle covering method of the present invention.

Now referring to FIGS. 10A-10E, several aspects of valve handle 700 of the present invention created by handle covering method 600 are shown. FIG. 10A shows valve handle grip area 166 that may be used with handle covering method 600, but before handle covering method 600 has been performed. Valve handle grip area 166 is flat and preferably includes two holes 162 through which handle grip covering pieces 160, 164 will be attached. FIG. 10B shows valve handle 700 of the present invention, which is the completed product after handle covering method 600 has been performed. Valve handle grip area 166 has been covered on either side by handle covering pieces 160, 164, so that valve handle grip area 166 is no longer visible. First side 18 is covered by first handle covering piece 160, and includes text 12, which is preferably information selected by the customer. Second side 110 (not shown) is covered by second handle covering piece 164, and includes text 12, which is preferably the seller's insignia. FIGS. 10C and 9D show valve handle 700 across cross section A, labeled in FIG. 10B. FIG. 10C shows handle covering pieces 160, 164 and valve handle grip area 166 separated before they are joined to form valve handle 700. Handle covering pieces 160, 164 include protrusions 168 that are sized and dimensioned to fit in holes 162 of valve handle grip area 166. Protrusions 168 of handle covering pieces 160, 164 will protrude into holes 162 and meet within the depth of valve handle grip area 166 and secure handle covering pieces 160, 164 and valve handle grip area 166 together. FIG. 10D shows valve handle 700 across cross section A after handle covering method 600 has been performed. Valve handle grip area 166 is held snugly and securely between handle covering pieces 160, 164. Protrusions 168 are no longer visible in this view because they protrude into holes 162 within the depth of valve handle grip area 166. Handle covering pieces 160, 164 meet and are held tightly together at crease 170. Although the shapes of handle covering pieces 160, 164 are shown as depicted, one of ordinary skill in the art will appreciate that there are several variations on the shape of handle covering pieces 160, 164 that will achieve the desired effect, and these shapes are also contemplated as being within the scope of the present invention. FIG. 10E is a side view of valve handle 700 across cross section B, labeled in FIG. 10B. As in FIG. 10D, handle covering pieces 160, 164 meet and are held tightly together at crease 170. Valve handle grip area 166 is shown in dashed lines as being within the case formed by handle covering pieces 160, 164, and not visible from the outside of valve handle 700. Protrusions 168 of handle covering pieces 160, 164 are shown protruding through holes 162 of valve handle grip area 166. These are also shown in dashed lines as not being visible from the outside of valve handle 700.

Now referring to FIGS. 11A-11C, valve handle 800 of the present invention includes at least one, and preferably two, slots 804 within the width of the handle. An indicator/designation 806 sized and dimensioned to be placed within slots 804 so as to be visible on the outside of the handle includes information on the installer, installation, and function of the valve handle. Indicator 806 may be any item that includes the information and is sized and shaped so as to fit in the slots. Examples of indicators may be laminated paper, cardboard, or thin plastic or metal with etching. As shown in FIG. 11A, in embodiments of valve handle 800 where indicator 806 is less durable than plastic or metal, such as paper or cardboard, valve handle 800 includes clear plastic window 802 either affixed or able to be placed and removed as the outer faces of the valve handle.

Now referring to FIG. 12, first kit 1000 of the present invention is shown. First kit 1000 includes set of valve handles 1002, which includes at least two valve handles made from any of the manufacturing methods of the present invention. The valve handles included in set 1002 each include installer and installation information, as well as an indicator of function that comes from a standard set of functions.

Now referring to FIG. 13, second kit 1004 of the present invention is shown. Second kit 1004 includes set of valve handles 1006, which includes at least two valve handles made from any of the manufacturing methods of the present invention. The valve handles included in set 1006 each include an indicator in code. The valve handles in set 1006 may or may not include installer and installation information. Second kit 1004 also includes legend 1008. Legend 1008 includes the key to decipher the functions of the various valve handles included in set 1006.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A valve handle for operating a valve, said valve handle comprising permanent, integral labeling, wherein said labeling comprises installer information about an installer of said valve handle, comprising a name and contact information for the installer; a date of installation; and a function of the valve operated by said valve handle, said valve handle comprising:
    an attachment section that attaches to the valve operated by said valve handle; and
    a grip section, comprising a first and a second side, each of which comprise a space and a rim surrounding said space and traversing a perimeter of each of said first and second side, and further comprising text within said space; and
    at least one insert dimensioned for attachment within said space and comprising said permanent, integral labeling;
    wherein said spaces on said first and second sides of said grip section comprise at least two notches sized and dimensioned to accept and affixedly catch a notch counterpart;
    wherein said at least one insert is substantially flat, made of plastic, and sized and dimensioned to snugly fit within said rims of said first and second sides of said grip section;
    wherein said at least one insert comprises a top side comprising engraved text and a bottom side comprising at least two notch counterparts sized, dimensioned, and positioned on said bottom side to mate with said notch counterparts of said spaces of said grip section; and
    wherein said engraved text spells out said labeling and is flush with said rims of said grip portion when said at least one insert is affixed to said grip section.

2. A valve handle for operating a valve, said valve handle comprising permanent, integral labeling, wherein said labeling comprises installer information about an installer of said valve handle, comprising a name and contact information for the installer; a date of installation; and a function of the valve operated by said valve handle, said valve handle comprising:
    an attachment section that attaches to the valve operated by said valve handle; and
    a grip section, comprising a first and a second side, each of which comprise a space and a rim surrounding said space and traversing a perimeter of each of said first and second side, and further comprising text within said space; and
    at least one insert dimensioned for attachment within said space and comprising said permanent, integral labeling;
    wherein said spaces of said first and second sides of said grip section comprise at least two holes extending through said grip section from said first side to said second side;
    wherein said at least one insert is substantially flat, made of plastic, and sized and dimensioned to snugly fit within said rims of said first and second sides of said grip section;
    wherein said at least one insert is two inserts each of which comprises a top side comprising engraved text and a bottom side comprising two protrusions sized, dimensioned, and positioned on said bottom side to mate with said holes of said spaces of said grip section;
    wherein said two protrusions of one of said two inserts snap affixedly into said two protrusions of the other of said two inserts to permanently affix said two inserts to said grip section;
    wherein said engraved text of said top side of one of said two inserts indicates a function of the valve and said engraved text on said top side of the other of said two inserts indicates installer information and date of installation; and
    wherein said engraved text is flush with said rims of said grip section when said two inserts are affixed to said grip section.

3. A valve handle for operating a valve, said valve handle comprising permanent, integral labeling, wherein said labeling comprises installer information about an installer of said valve handle, comprising a name and contact information for the installer; a date of installation; and a function of the valve operated by said valve handle, said valve handle comprising:
    an attachment section that attaches to the valve operated by said valve handle; and
    a grip section, comprising a first and a second side, each of which comprise a space and a rim surrounding said space and traversing a perimeter of each of said first and second side, and further comprising text within said space; and
    at least one insert dimensioned for attachment within said space and comprising said permanent, integral labeling;
    wherein said at least one insert is substantially flat, made of metal, and sized and dimensioned to snugly fit within said rims of said first and second sides of said grip section;
    wherein said at least one insert comprises a top side comprising engraved text and a bottom side able to be snap fit into one of said spaces of said grip section; and
    wherein said engraved text spells out said labeling and is flush with said rim of said grip portion when said at least one insert is affixed to said grip section.

4. The valve handle as claimed in claim 3, wherein adhesive is placed between said at least one insert and said space of said grip section.

5. A valve handle for operating a valve, said valve handle comprising permanent, integral labeling, wherein said labeling comprises installer information about an installer of said valve handle, comprising a name and contact information for the installer; a date of installation; and a function of the valve operated by said valve handle, said valve handle comprising:

an attachment section that attaches to the valve operated by said valve handle;

a grip section, comprising:

a valve handle grip area comprising a first and a second side comprising at least two holes extending through said grip section from said first side to said second side; and first and second handle metal covering pieces;

wherein each of said first and second handle covering pieces are sized and dimensioned to surround one of said first and second sides of said valve handle grip area;

wherein each of said first and second handle covering pieces are sized and dimensioned to fit together so as to surround the entire of said valve handle grip area;

wherein each of said first and second handle covering pieces comprises at least two protrusions sized, dimensioned, and positioned so as to mate with at least two holes extending through said valve handle grip area;

wherein said protrusions of said first and second handle covering pieces are designed to affixedly mate with one another so as to affix said first and second handle covering pieces to said valve handle grip area; and wherein each of said first and second handle covering pieces further comprises engraved text spelling out said labeling.

6. The valve handle as claimed in claim 5, wherein said first and second handle covering pieces of said grip section each further comprises finger grips.

* * * * *